United States Patent
Gibson

(10) Patent No.: US 7,946,373 B2
(45) Date of Patent: May 24, 2011

(54) RECREATIONAL AND UTILITY THREE OR FOUR-WHEELED RECUMBENT CYCLE WITH ON-DEMAND ZERO EMMISSIONS ELECTRIC MOTOR AND MULTI-GEARED MANUAL PEDAL DRIVE

(76) Inventor: Robert Denis Gibson, Indio, CA (US)

(*) Notice: Subject to any disclaimer, the term of this patent is extended or adjusted under 35 U.S.C. 154(b) by 0 days.

(21) Appl. No.: 12/802,561

(22) Filed: Jun. 9, 2010

(65) Prior Publication Data

US 2010/0314179 A1  Dec. 16, 2010

Related U.S. Application Data

(60) Provisional application No. 61/268,462, filed on Jun. 11, 2009.

(51) Int. Cl.
*B62K 11/00* (2006.01)
(52) U.S. Cl. ........................ 180/205; 180/207
(58) Field of Classification Search .................. 180/205, 180/207; 280/288.1
See application file for complete search history.

(56) References Cited

U.S. PATENT DOCUMENTS

| | | | | | |
|---|---|---|---|---|---|
| 4,456,277 | A | * | 6/1984 | Carpenter | 280/282 |
| 5,788,254 | A | * | 8/1998 | Davis | 280/282 |
| 5,853,062 | A | * | 12/1998 | Hulett | 180/206 |
| 7,108,097 | B1 | * | 9/2006 | Bolton et al. | 180/205 |
| 7,114,737 | B1 | * | 10/2006 | Rasmussen | 280/261 |
| 7,264,254 | B1 | * | 9/2007 | MacTaggart | 280/213 |
| 7,690,390 | B2 | * | 4/2010 | Hopkins et al. | 135/88.03 |
| 2002/0113402 | A1 | * | 8/2002 | Ochs | 280/282 |
| 2006/0151224 | A1 | * | 7/2006 | Vasser | 180/205 |
| 2009/0090405 | A1 | * | 4/2009 | Hopkins et al. | 135/88.03 |

* cited by examiner

*Primary Examiner* — Joanne Silbermann
*Assistant Examiner* — Michael R Stabley

(57) ABSTRACT

One embodiment of a single person recumbent three or four-wheeled, zero emissions utility and recreational cycle vehicle provided with an electric motor driven from a battery and a multiple geared manual pedal mechanism with rear axle derailleur allowing the user to either select individually, or select simultaneously, electric powered or manual pedaling locomotion; also incorporating a rear axle limited slip differential and extra wide tires; and incorporating modular frame, canopy and rear axle design and construction, front and rear disc brakes, a highly-visible canopy; and incorporating a multi-purpose trailer or accessory hitch or receiver for attaching on-board cargo and material carrying devices or for towing of other vehicles for transport of personnel and materials.

4 Claims, 4 Drawing Sheets

102: Seat back
104: Front Fork
106: Front Frame
108: Rear Wheel
110: Crankset
112: Front Wheel
114: Cassette
116: Electric Drive Motor
118: Seat Base
120: Rear Frame
122: Idler Pulley
124: Handlebars
126: Canopy
128: Battery box 102: Seat back
104: Front Fork
106: Front Frame
108: Rear Wheel
110: Crankset
112: Front Wheel
114: Cassette
116: Electric Drive Motor
118: Seat Base
120: Rear Frame
122: Idler Pulley
124: Handlebars
126: Canopy
128: Battery box 202: Canopy
204: Front half of frame
206: Front fork and wheel
208: Rear half of frame
210: Rear axle assembly
212: Limited slip Differential
214: Battery box
216: Steerer tube 302: Pedal driven derailleur
304: Chain
306: Idler Pulley/ chain guide
308: Crankset
310: Limited slip differential
312: Trailer/accessory hitch
314: Drive belt from the motor
316: Electric drive motor
318: Pedal driven Cassette
320: Idler pulley/chain guide 402: Canopy
404: Seatback
406: Handlebars
408: Seatbase
410: Front wheel
412: Rear left wheel
414: Rear wheel spacing/ axle length.

US 7,946,373 B2

RECREATIONAL AND UTILITY THREE OR FOUR-WHEELED RECUMBENT CYCLE WITH ON-DEMAND ZERO EMMISSIONS ELECTRIC MOTOR AND MULTI-GEARED MANUAL PEDAL DRIVE

CROSS-REFERENCE TO RELATED APPLICATIONS

This application claims the benefit of provisional patent application Ser. No 61/268,462 filed Jun. 11, 2009 by the present inventor.

FEDERALLY SPONSORED RESEARCH

Not Applicable

SEQUENCE LISTING OR PROGRAM

Not Applicable

BACKGROUND

1. Field

This application generally relates to a low-speed lightweight three or four-wheeled recumbent cycle for recreational and utility uses operated by a user-chosen combination of either a multiple geared manual pedal system or an on-demand zero-emissions electric motor; incorporating a modular frame and rear axle construction design; also incorporating a rear wheel limited slip differential and utilizing oversized, large width tires; a highly visible canopy top; optional photovoltaic cell panel mounted on the canopy frame for battery recharge purposes, and also incorporating a rear end trailer hitch or receiver towing feature.

2. Prior Art

Various alternative energy, "low-emissions" low-speed three and four wheeled vehicles have been proposed in the past for the general purpose of extending mileage and reducing emissions. Within this general population of vehicles is what is commonly referred to as a "Neighborhood Electric Vehicle" ("NEV"). An NEV, in turn, is defined as a battery electric vehicle falling under the United States Department of Transportation classification for low-speed vehicles, a federally-approved street vehicle classification under Federal Motor Vehicle Safety Standard 500 (FMVSS 500), having a gross vehicle weight rating of less than 3,000 pounds and a top speed of between 20 to 25 miles per hour (49 CRF Part 571 et seq.). NEVs are also sometimes referred to as "Low Speed Vehicles" ("LSV"). Many of these NEVs utilize strictly electrical motors powered by a battery for their means of locomotion, with the battery being charged/recharged by either a solar array on the vehicle itself or in combination with recharging by plugging the unit into a standard 110 volt electrical a/c outlet. Most NEVs are not lightweight and are typically designed for more than one passenger. Moreover, they generally do not include a manual locomotion option and are propelled exclusively by means of the electric power. Some states that authorize NEV's generally restrict their operation to streets with a maximum speed limit of 35 to 45 mph. Because of federal law, however, dealers may not sell non-human powered vehicles that can go faster than 25 mph. If such a vehicle is designed or modified to exceed 25 mph, it then becomes subject to the safety requirements applicable to passenger cars.

Regulations for operating NEV's vary by state with the federal government permitting states to impose additional safety requirements beyond those contained in federal regulations (49 CFR Part 571.5), and as noted, many states restrict their use to streets with lower overall speed limits. Many local communities provide separate routes for NEV's and may impose further safety and design requirements upon them. Generally speaking, however, because of their weight and maximum speed capabilities, most NEV's are primarily designed for use on hard surfaces (concrete or asphalt) and are generally not "turf friendly".

The United States Army has indicated an intention to acquire 4,000 NEV's within the next three years to be used for transport of personnel, security patrol, maintenance and delivery services (www.army.mil/-newsrelease/2009/01/12/15707.\

Maximizing the potential for physical exercise by providing for manual locomotion in combination with employment of a zero-emissions electric motor, could enhance the utility and recreational features of NEVs and, owing to the numerous tax incentives available generally for such vehicles, make them generally more economically attractive to own and available to a wider segment of the public.

Specific prior art including an electric tricycle, driven by one motor supplied by battery and recharged by solar panels is described in Sharan, U.S. Pat. No. 6,021,862. The solar panels are mounted on the roof and track the sun. Electric braking is employed. No manual means of locomotion is indicated. The mechanical means for constructing the vehicle are not apparent. Young, U.S. Pat. No. 7,185,726 discloses a bicycle with detachable optional electric motor assist. Whittaker, U.S. Pat. No. 6,155,369 discloses another electric motor-driven bicycle but without employing a detachable electric motor feature. Both of these inventions, however, are bicycles and do not include three or four-wheeled vehicles.

There are also a number of pedal and motor assist driven multi-wheeled vehicles. Schoenberg, U.S. Pat. No. 7,017,685 shows a pedal/motor driven tricycle employing a 1 hp motor supplied by batteries charged by solar panels and a pedal-driven generator. However, no pedal multi-gearing (derailleur) mechanism is indicated and, accordingly, operating the vehicle by manual means alone on grass or similar turf would be a physical challenge for any extended period of time. No rear axle limited slip differential mechanism is employed, thus resulting in driving power (pedal or electric) being provided equally to both rear wheels via the rear axle, nor does there exist a rear "hitch" for the purpose of towing materials, cargo, etc. behind the vehicle. Maurer, U.S. Pat. No. 6,402,174 discloses a pedal-driven three-wheeled recumbent tricycle with an adjustable leaning and steering mechanism but also without either a pedal gearing mechanism nor the combination of an electric motor. Harada, et al, U.S. Pat. No. 6,104,154 discloses a tricycle with an electric motor and pedal drive but without employment of a multi-geared derailleur system for facilitating manual locomotion, nor a rear hitch for towing and transporting materials, cargo, etc. Levavi, U.S. Pat. No. 4,875,699 discloses a two-person pedal driven tricycle. Donoghue et al, U.S. Pat. No. 4,852,898 discloses a hydraulic pedal-operated polycycle employing a hydraulic cylinder and piston system to amplify the pressure of the pedaling action. Harmon, U.S. Pat. No. 4,792,149 discloses a pedal-drive two-person golf cart not employing an electric motor nor a multiple gearing system for pedaling. Carpenter, U.S. Pat. No. 4,456,277 discloses a human powered front wheel drive tricycle having two steerable front wheels. Randolph et al, U.S. Pat. No. 4,408,776 discloses a three wheel vehicle employing a pair of front wheel and axle assemblies. A pivotable rear fork and single rear wheel axle assembly provides steering. No electric motor is employed.

Pivar, U.S. Pat. No. 4,313,517 discloses a lightweight electrically driven three-wheeled vehicle employing two batteries for powering the motor assisted by pedal drive. The manual pedal mechanism, however, is provided for emergency use only when the electric motor is not functioning and not generally for manual locomotion. The seating is upright and not recumbent. No multiple gearing system is used with the pedal arrangement nor does the rear axle employ a limited slip differential, nor does the vehicle include any capability for towing.

Prior art has not disclosed the employment of multiple gearing for manual pedal locomotion in similar vehicles and generally relies on fixed transmission ratios. As such, manual pedaling for any significant period of time on soft terrain, such as grass, dirt or gravel and similar turf, would be a physical challenge. The implementation of a derailleur mechanism employing at least seven (7) independent gearing ratios would address this problem and allow the user enhanced physical exercise without unnecessary resort to use of the electric motor thus enhancing battery life while providing a maximum opportunity for physical exercise.

Prior art has not disclosed incorporation of a limited slip rear differential along with or without extra-wide tires and overall low vehicle weight to minimize the impact on grass and similar turf. This is particularly important under circumstances where one rear wheel may be situated in a wet or "soft" turf environment while the other rear wheel situated on more dry or stable ground. Employing a limited slip feature and thus transmitting the power to only that wheel situated on dry or stable ground, the vehicle would be able to move forward without unduly "spinning" and "digging" into the wet or unstable spot occupied by the other rear wheel. A vehicle employing such a limited rear axle differential and being utilized for golf purposes (on any similar activity done on grass or similar turf) would have a reduced impact on the underlying grass or turf.

Prior art has also not disclosed employment of frame (front and rear portions) and rear axle modularity. Frame and axle modularity in the design and construction of the vehicle would facilitate both its manufacture and, more importantly, shipping and transfer, thus reducing transportations costs and facilitating access to numerous potential manufacturing locations, including developing nations where lower costs for fabrication may exist. Having such frame modularity would also facilitate alterations and improvements in a single component without having to redesign the entire vehicle assembly. Employing the ability for modular connection of a canopy can further enhance this feature.

Prior art has generally emphasized use of similar vehicles for personal locomotion, except perhaps only in conjunction with playing golf and incorporating an on-board carrier for carrying the necessary clubs and equipment. The potential utility feature of similar vehicles has been ignored or de-emphasized. Thus prior art emphasizes a focus on the recreational uses and related potential of the vehicle and minimizes or avoids altogether emphasis for potential use of the vehicle for a variety of utility purposes such as personnel movement, movement of pets and baby carriages, light cargo transport, tolls and maintenance and related equipment transport and the like. Multiple optional rear end attachments would allow interchange between various on-board cargo-carrying devices, a carrier for golf equipment being but one. In addition, incorporation of a rear "trailer hitch" or "receiver" would allow the vehicle to tow small trailers or similar non-powered vehicles thus enhancing the utility aspect of the vehicle.

The use of a multiple geared (derailleur) manual pedaling system can maximize physical exercise while employing the vehicle for either recreational or utility purposes on a wide variety of surfaces, including grass, dirt and pavement.

Resort to a sturdy and highly-visible canopy would not only protect the occupant from sun, wind, rain, etc. but would also provide a safety factor, increasing the ability of the surrounding traffic, persons, etc. to see the vehicle. An optional solar panel for the purpose of recharging the electric battery can be readily mounted to the canopy thus minimizing the need for a/c recharge and maximizing the battery life during operation.

OBJECTIVES OF THE INVENTION

In accordance with the preferred embodiment, it is an object of the invention to provide an improved three or four-wheel recreational and utility recumbent cycle type vehicle.

By utilizing a recumbent seating arrangement, the invention further maximizes its physical exercise feature as well as enhanced safety in its operation. Wikipedia reports a number of significant advantages of a recumbent design over an upright seated design. A recumbent design minimizes "tip-over" potential for the rider by moving the center of mass of the vehicle lower to the ground than would be extant for an upright rider design. Moreover, by having a lower center of gravity, safety in braking is also enhanced by minimizing the risk of an operator "flying over the handlebars" with vigorous braking. A recumbent riding position reduces strain on the body, making it suitable for longer distance operations. Because pedals are not located under the seat as in many other prior art designs, the seat can be larger thus allowing the rider's weight to be distributed to a larger surface area, reducing urogenital physical problems often associated with upright rider arrangements. Moreover, it is reported that many riders prefer a recumbent design to alleviate chronic back pain or neck pain associated with upright vehicles. Another object of the invention is to employ the recumbent seating design thus maximizing the many positive safety and health benefits reported in the literature for recumbent bi- and poly-cycles generally Another object of the invention is to provide a recreational and utility recumbent cycle or vehicle with an improved manual pedaling system utilizing multiple gearing and a rear-axle derailleur connected to a handle-bar mounted "twist" gear changer, of the type typically found on multi-geared bicycles.

It is another object of the invention to maximize the potential for providing physical exercise to the operator in the operation of the vehicle by utilizing the multiple geared pedal system in conjunction with zero emissions electrical power. When fatigued or faced with an uphill terrain that may strain manual locomotion effort, the operator can seamlessly switch to electric power, switching back to manual locomotion when desired.

Still another object of the invention is to incorporate modular design and construction of the rear and front frames, rear axle assembly and canopy maximizing the range of geographic opportunities for manufacturing and assembly by minimizing the transportation costs of the vehicle and its components while also maximizing the ability to facilitate design and construction modifications and improvements without resort to overall vehicle redesign.

Another object of the invention is to employ extra-wide tires to minimize impact on grass and similar turf and wide spacing of the rear wheels adding stability to the vehicle.

Another object of the invention is to employ the use of handle-operated front and rear disc brakes.

Another object of the invention is to incorporate a limited slip rear differential to be available to the user under both manual and electric-powered locomotion to further minimize impact to grass and similar turf thus allowing power to be supplied independently to either rear wheel.

Another object of the invention is to incorporate a rear "hitch" or "receiver" to facilitate towing of equipment, personnel, and the like in order to enhance the utility nature of the invention.

Another object of the invention is to incorporate a highly-visible canopy to protect the operator from wind, rain and sun while providing an enhanced safety feature allowing the vehicle to be easily seen by third persons and other vehicles.

Another object of the invention is to facilitate qualifying the invention as a Neighborhood Electrical Vehicle, as most, if not all, NEV's per se, are propelled exclusively by electric motor and not accompanied by manual locomotion. Qualifying the invention as an NEV will facilitate greater affordability since many NEV's qualify for state and federal tax credits and benefits.

SUMMARY—BRIEF DESCRIPTION OF THE INVENTION

The preferred embodiment of the invention (FIG. 1) comprises a recumbent three or four-wheeled cycle with part-time on-demand electric power provided by a motor drive unit coupled with an on-board rechargeable battery, comprising two rear drive wheels and either one or two front wheels, foot pedals and crankset, and a chain engaged on sprockets providing a manual power system to the rear wheels by use of a multiple geared transmission drive system; each rear wheel having a non-friction rotary drive member connected to a power coupling element capable of transmitting power independently to either of said rear wheels and connected to the rotary drive output of the motor drive unit and to the pedals and chain and manual power system (see FIG. 3 generally).

This same embodiment of the invention further comprises a zero emissions recreational and utility vehicle also incorporating a rear axle limited slip differential (310) and extra wide tires; and incorporating a modular frame and rear axle design and construction (FIG. 2), front and rear disc brakes and a highly-visible canopy (126 and 202); and incorporating a rear towing hitch or receiver (312b) for attaching a variety of tow vehicles for transport of personnel and materials.

To prepare for operating the invention, a form of recumbent tricycle, the operator/rider must adjust the seat (102) forward or backward using the adjusting mechanism under located the seat. The adjustment is done to fix the proper distance for the rider's legs to reach and properly push the foot pedals, which are in front of, rather than below the seated rider.

The single operator, while operating the vehicle in a forward motion, sits on the cushioned seat with both feet remaining on the foot pedals and both hands remaining on the handle bars (124) at all times. To move the vehicle in reverse, the operator removes himself or herself from the seat and manually rolls the vehicle backwards.

Three options exist to the rider for propelling the vehicle forward: 1) sole use of the foot pedals, together with the multi-speed twist shifter located on the right handle grip, which controls the rotational speed of the foot pedals, 2) use the electric drive motor (316) alone, with feet resting on the foot pedals, or 3) use of both the foot pedals and the electric motor simultaneously. It should be noted that while the maximum speed of the vehicle utilizing the electric motor alone is typically 10 miles per hour (16 km/h) or less, the speed of the vehicle under manual locomotion is not so limited and is limited only by the physical ability of the operator.

Slowing or stopping the vehicle is accomplished by using brake levers mounted on each handle bar grip (124). These levers, in turn, are connected to disk brakes located on both front and rear wheels. To operate the brakes, the rider simply squeezes either or both of the brake levers, with varying intensity, depending on how fast the vehicle is moving or in what distance the rider desires to stop. The brakes can be locked in order to keep the vehicle from rolling while it is parked by use of a lock button located on the handle bar brake levers. This is accomplished by squeezing the brake lever while depressing the button adjacent to the lever, then releasing the brake lever into the locked position. Both front and rear brakes can be locked in this manner and disengaged by reversing the procedure of squeezing the brake lever and removing the lock button from its locked position.

The vehicle canopy employs a fade-resistant canvas material made in one of a number of a highly-visible colors. It is fixed to the canopy by "Velcro" fasteners. Manual roll up windows are located on the front and rear of the canopy top, and are secured in the down and up positions by the use "Velcro" fasteners. In the up or open position, the rider enjoys the benefits of less resistance and fresh air. In the down position, the rider enjoys the benefits of protection from weather, including rain and wind.

An optional golf bag holding rack (not illustrated) is located behind the seat and connected to the rear carriage frame by being attached to a cargo carrying multi-purpose trailer/accessory hitch (312) permanently connected to the rear carriage frame (208). Straps at the top and bottom of the golf bag holding rack are used to secure the bag to the cargo carrying frame golf bag frame. The frame has an adjustable hinge which allows the top of the golf bag to be tilted down or up for ease in selecting clubs from the bag by individuals of different height. A variety of other types of cargo carrying racks (not illustrated) can be substituted for the golf bag rack to permit the vehicle to safely and efficiently carry, on-board, a wide variety of materials, equipment, pets, and the like.

The multi-purpose trailer/accessory hitch (312) is located at the rear of the vehicle connected to the rear carriage frame. The hitch allows the operator to attach various types of non-powered vehicles and trailers including but not limited to trailers designed to be used as baby carriages, pet carriages, as well as small trailers used to transport goods and materials such as landscaping equipment, tools, building and maintenance supplies, and the like.

The vehicle can be operated for approximately 30 kilometers, or 18 miles, using battery power alone, on a single battery charge. This assumes an average sized operator weighing 175 pounds operating the vehicle on terrain with a normal amount of uphill and downhill slopes such as may typically be found on an average 18-hole golf course. Thus the vehicle range utilizing electric power alone is well in excess of the length of any typical 18-hole golf course. An on-board optional photovoltaic cell panel affixed to the top of the canopy can extend this distance depending on the time of day and weather conditions. Moreover, longer distances can be achieved by resort to manual pedaling in conjunction with the electric motor, and due to the weight of the vehicle, its use of extra-wide tires, the multiple gearing mechanism and the limited slip rear axle differential, it is recommended that the use of manual locomotion be maximized when operating the vehicle on level terrain. The battery, located in the battery box (128, 214) mounted to the front carriage frame (204) is charged by plugging a provided battery charger into any a/c electrical wall socket on one end, and into a receptacle on the battery case on the other end.

DRAWINGS (FIGS. 1-4)

Drawings

Reference Numerals

102: Seat back
104: Front fork
106: Front frame (also referred to as "front carriage frame")
108: Rear wheel
110: Crankset
112: Front wheel
114: Cassette
116: Electric motor drive
118: Seat base
120: Rear frame (also referred to as "rear carriage frame")
122: Idler pulley
124: Handlebars
126: Canopy
128: Battery box
202; Canopy (see also 126)
204: Front frame (also referred to as "front carriage frame"—see also 106)
206: Front fork (see also 104) and wheel
208: Rear frame (also referred to as "rear carriage frame"—see also 120)
210: Rear axle assembly
212: Limited slip differential
214: Steerer tube
302: Pedal drive derailleur
304: Chain
306: Idler pulley/chain guide (low tension side)
308: Crankset (see also 110)
310: Limited slip differential
312: Trailer/accessory hitch (also referred to as a "hitch or receiver")
314; Drive belt from motor
316: Electric drive motor
318: Pedal driven cassette
320: Idler pulley/chain guide (high tension side)
402: Canopy (see also 126, 202)
404: Seatback
406: Handlebars (see also 124)
408: Seatbase (see also 118)
410: Front wheel (see also 112)
412: Rear left wheel
414: Rear wheel spacing/rear axle length

DETAILED DESCRIPTION OF PREFERRED EMBODIMENT

FIGS. 1-4

FIG. 1

Figure 1:
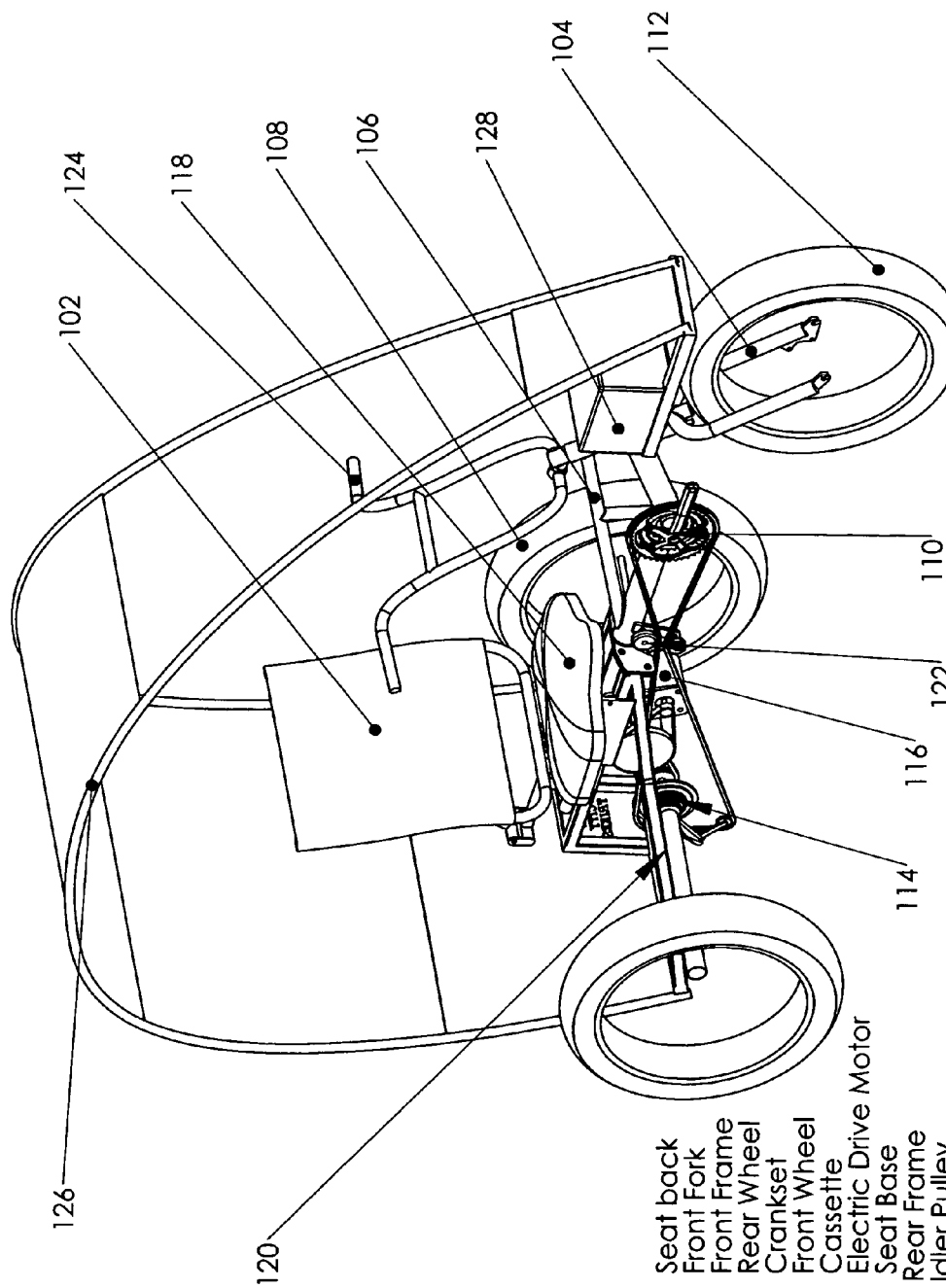
FIG. 1 is a composite side view of the invention according to the preferred embodiment (three-wheeled)

This Figure generally shows the complete assembled cycle in the preferred configuration or embodiment. Specific key illustrated components of the assembly are:

102: Seatback consisting of a tubular frame with nylon fabric upholstery. The nylon upholstery is hung over the bent frame to provide a soft seatback, which is contoured to provide lumbar support. On the rear side of the seatback are upper and lower tabs welded to the tubular frame to provide pivot points such that the seat back position can be adjusted to suit the riders comfortable seating position.

104: Front fork consisting of fork blades each welded to a single steerer tube (214), and having a disc brake mount on the lower end. The disc brakes are attached by cables to hand operated levers on the handlebars (124). The fork spacing is wide enough to accommodate the wheel and tire. There is a crown race seat welded to the steerer tube to receive a threadless bicycle headset.

106: The front frame consists of five tubes, a flange plate and a 68 mm bottom bracket shell with English threads. These pieces are welded together in the configuration shown. The head tube has a 34 mm internal diameter, so that it can receive a standard threadless bicycle headset. The rear flange is carefully aligned to the frame to ensure straightness of the frame.

108: Rear wheels have cantilevered disc brake hubs (with ISO 6 bolt mount pattern to accept a brake rotor), 36 spokes, and 20 inch diameter rims which are more than 2 inches wide. These wheels take 20×4.25 tires.

110: Crankset consisting of a single chain wheel, mounted to a 68 mm square tapered spindle bottom bracket, and with opposing crankarms.

112: Front wheel has a conventionally mounted disc brake hub (with ISO 6 bolt mount pattern to accept a brake rotor), 36 spokes, and 20 inch diameter rims which are more than 2 inches wide. These wheels take 20×4.25 tires.

114: Cassette: Standard 7 speed bicycle cassette with sprockets ranging sizes starting from 11 and increasing to 34 teeth.

116: A brushed DC electric drive motor.

118: Seat base consisting of an upholstered cushioned recumbent seat mounted to a seat base subframe with adjusts forward and aft with respect to the rear frame.

120: Rear frame consists of a system of 12 welded square and rectangular tubes, a flange plate, and sheet metal shields. The alignment of the flange plate with respect to the frame is carefully checked during fabrication to ensure straight frame alignment. The sheet metal shields protect users and observers from the moving drive train parts. Welded to the underside of the rear frame are clamps which permit attachment of the rear axle. Bolted to the underside of the rear frame are mounts for the electric drive motor, idler pulleys, and derailleur dropouts.

122: Idler pulleys guide the chain, so that it does not interfere with the flange joining the front and rear frames. The idler pulleys also serve to control and guide the chain, preventing excessive chain slap.

124: Handlebars consist of typical bicycle high rise handlebars. The handlebars have at least 18 inches of rise and are mounted to the front fork via a standard bicycle stem.

126: The canopy consists of dual rails, which are each supported at the front and rear of the cycle frame. They are further joined together by two tubes in two separate locations between the mounting points with the frame. The canopy rails are bent members which are joined in several location so that they can be broken down for transportation and shipping.

128: Battery box contains the batteries and controller for the electric drive system. It is mounted to the front half of the frame. In addition to being a convenient place to store the battery and controller it also serves to add weight to the front wheel assisting with traction and steering.

FIG. 2

Figure 2:
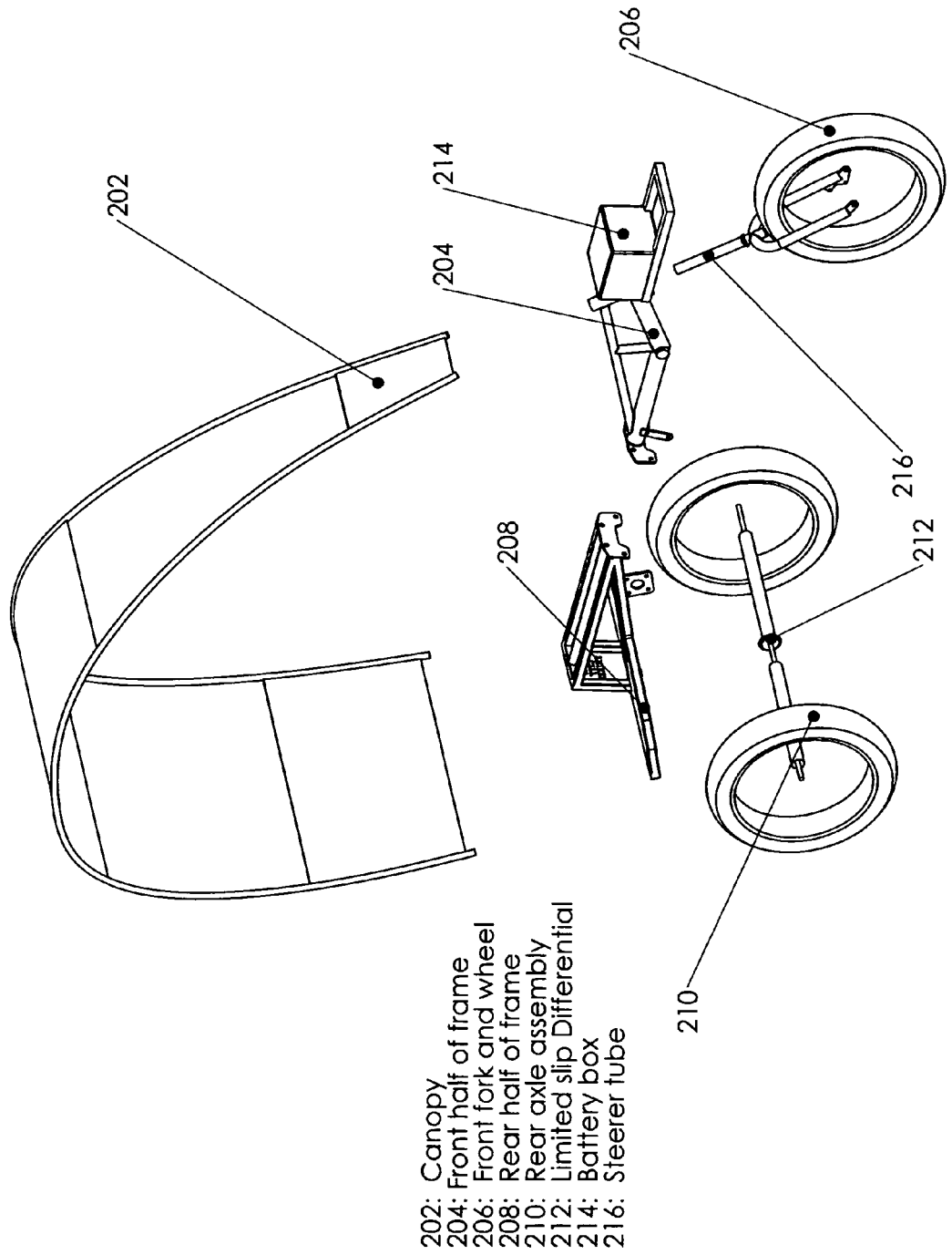
FIG. 2 is an exploded view of the key showing the rear carriage frame, front carriage frame and rear axle modularity of the invention according to the preferred embodiment. It also illustrates the modularity feature of the canopy.

This Figure generally drawing shows an overall exploded view of the major components of the cycle and illustrates the modularity of the cycle. The modularity feature includes the ability to split the frame, remove the rear axle assembly, the canopy and also the front fork mechanism. This modularity provides a unique functional advantage to the cycle because by vastly reducing shipping costs, while increasing transportability and repair options. FIG. 2 also illustrates the location of the limited slip differential. Key parts and modularity functions are:

202: A canopy as further described FIG. 1, part 126 can be detached from the frame of the cycle and broken down for shipment.

204: Front half of the frame as further described in FIG. 1, Part 106. This illustration shows that it can be detached from the rear half of the frame (208) at the flange, and it can be detached from the front fork (104) and wheel (112) at the head set.

206: The front fork and wheel can be detached from the front half of the carriage frame at the headset.

208: The rear half of the carriage frame can be detached completely from the canopy (126 and 202), front half of the frame (106 and 204), and the rear axle assembly 210).

210: Rear axle assembly can be detached from the rear frame

212: The limited slip differential is an integral part of the rear axle assembly (210). It takes power from either the pedals or the electric drive motor, or both, and distributes it to the rear wheels (108). The limited slip differential contains over running clutches (sometimes referred to as sprag bearings) which sends torque to the wheel which is moving at the lowest velocity. This is an important feature for maintaining traction on uneven loose surfaces, and, as noted, can minimize impact on wet or muddy turf.

214: The battery box contains the batteries and controller for the electric drive system. It is mounted to the front half of the frame. In addition to being a convenient place to store the battery and controller it also serves to add weight to the front wheel which helps with traction and steering.

216: Steerer tube welded to the fork (104) and connected to the handlebars (124)

FIG. 3

Figure 3:
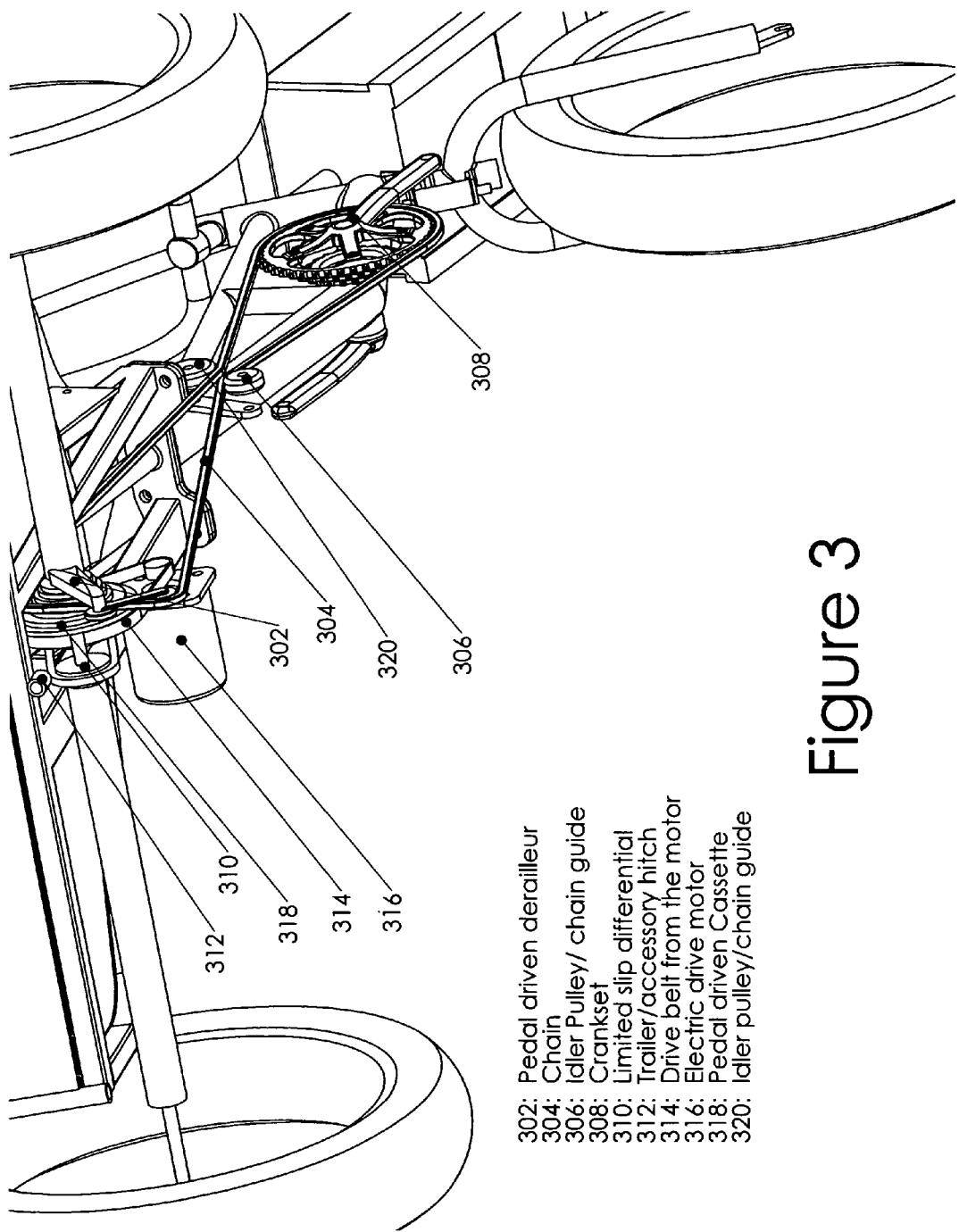
FIG. 3 is a rear sectional underside view of the invention's drive train and its components showing the location and the working relationship between the two power sources (manual pedal and electric motor), the crankset, chain drive and derailleur, the limited slip differential according to the preferred embodiment.

FIG. 3 is a detailed view of the drive train of the cycle as shown from the perspective of the underside rear view of the cycle. It shows the electric drive motor (116), pedal drive and crankset system (110) and the rear axle assembly (210). The figure also shows the universal hitch on the rear frame (312) which is an important feature of the cycle, allowing various accessories to be mounted to, connected to or towed from the rear of the cycle.

302: Pedal driven derailleur: This is a standard bicycle derailleur mounted to the rear axle tube. This device moves the chain from one sprocket to another on the cassette to change drive ratios for the pedal drive system.

304: Chain is standard 3/32 inch 7-8 speed steel bicycle chain.

306: Idler Pulley/chain guide is comprised of a cylindrical plastic wheel, with a groove machined into the outer circumference. The idler pulley runs on the low tension or return side of the chain and serves to guide and control the chain and prevent excessive chain slap. The idler pulley is made from wear and abrasion resistant "Delrin" (DuPont Trademark), and has a cartridge bearing press-fit into the internal diameter allowing for easy replacement.

308: Crankset consisting of a single chain wheel, mounted to a 68 mm square tapered spindle bottom bracket, and with opposing crankarms.

310: The limited slip differential is a device that takes power from both the pedals and the electric drive motor, and distributes it to the rear wheels. The limited slip differential contains over running clutches (sometimes referred to as sprag bearings) which sends torque to the wheel which is moving at the lowest velocity. This is an important feature for maintaining traction on uneven loose surfaces.

312: Trailer/accessory hitch is a mounting point on the frame from which accessories such as golf club racks, child seats, trailers, and luggage carriers can be easily and quickly mounted to the rear of the cycle. The universal hitch receiver has a 0.5 inch internal diameter so that it can receive a 0.5 inch quick release locking ball pin.

314: Drive belt from the motor consists of a steel ribbed timing belt to transmit torque from the electric drive motor (316) to the rear differential (310).

316: Electric drive motor is a brushed DC 800 watt motor.

318: Pedal driven cassette is a cluster of 7 sprockets mounted in a standard cassette configuration. This intern is mounted on a free wheel ratcheting device which allows the rider to either apply power to the wheels with the pedals or to sit idle with feet on the pedals while the cycle is in motion.

320: Idler pulley/chain guide is comprised of a cylindrical plastic wheel with a groove machined into the outer circumference to guide the chain around the flange on the frame of the cycle. This part (as differentiated from a similar part 306) runs on the high tension side of the chain and is designed to control the chain path. The idler pulley is made from wear and abrasion resistant "Delrin" (DuPont Trademark), and it has a cartridge bearing press-fit into the internal diameter allowing for easy replacement.

FIG. 4

Figure 4:
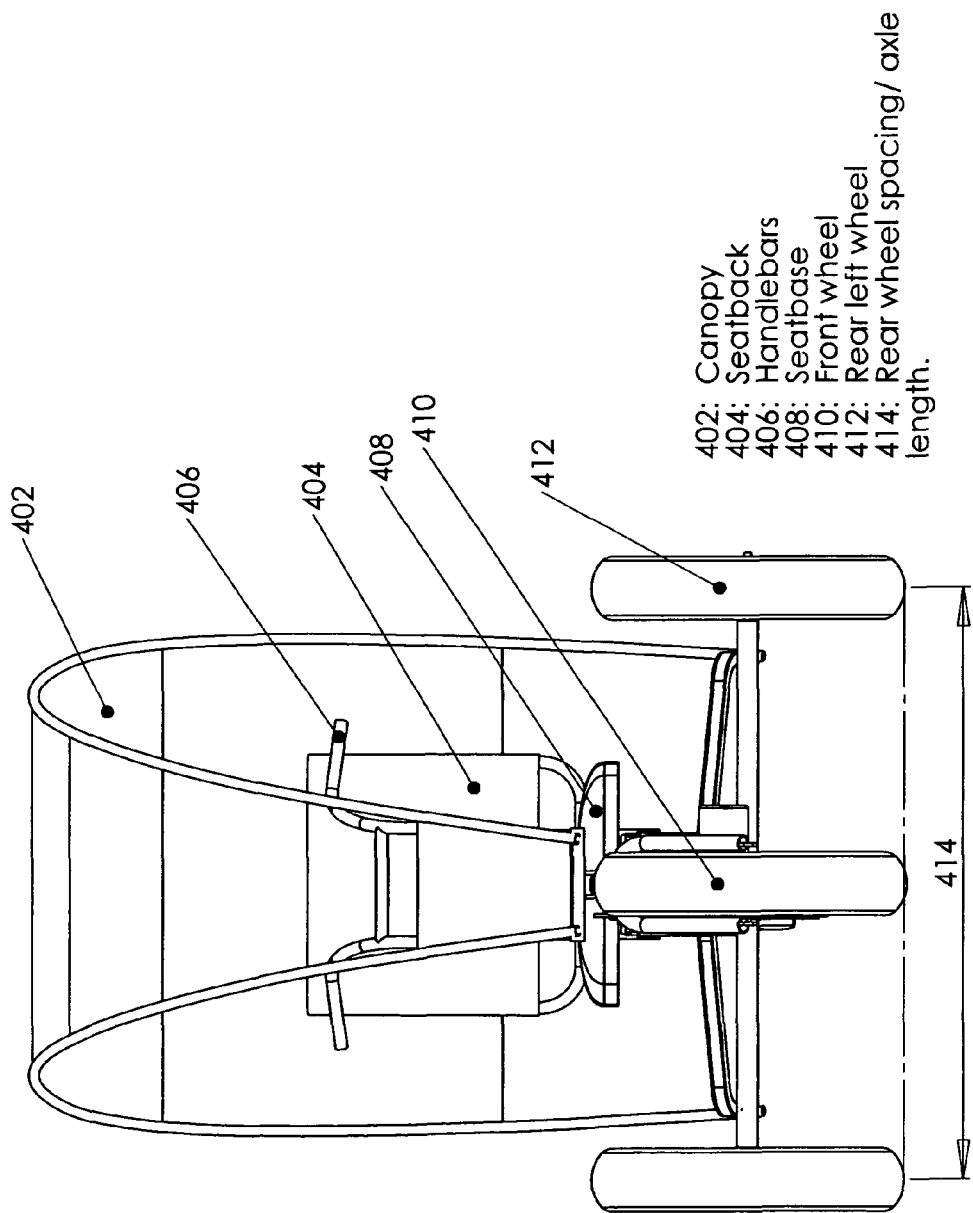
FIG. 4 is a front view of the invention showing the rear wheel width relative to the overall wide of the vehicle itself according to the preferred embodiment.

FIG. 4 is a front view of the cycle illustrating the significance of the width of the rear wheels for stability. Key part are:

402: Canopy as described in 126 and 202.

404: Seatback as described in 102.

406: Handlebars as described in 124.

408: Seatbase as described in 118.

410: Front wheel as described in 112.

412: Rear left wheel as described in 108

414: Rear wheel spacing/axle length. This is the distance between the contact patches of the rear wheels with the ground. To achieve stable steering and handling characteristics in real world use situations, the rear wheel spacing/axle length needs to be a minimum of 40 inches.

CONCLUSIONS, RAMIFICATIONS AND SCOPE

Accordingly, the reader will see that the invention provides significant advantages over prior art for similar type vehicles in that:

- It permits maximum flexibility to the user to choose either zero-emissions electrical motor power or manual locomotion in a wide variety of terrain;
- It utilizes extra-wide tires and when combined with its overall lightweight design minimizes its impact on grass and similar turf;
- It permits the use of a multiple gears and a rear axle derailleur mechanism to facilitate manual pedal locomotion on a wide variety of terrain thus maximizes the potential for physical exercise over a wide variety of terrain;
- It provides a rear axle limited slip differential available on demand to the operator for either electrical or manual modes of locomotion thus further enhancing its ability to avoid damaging grass and turf;
- It is comprised of modular front and rear frame, rear axle and canopy modules maximizing its construction and manufacturing flexibility, reducing manufacturing related transportation costs and facilitating modifications and improvements without resort to complete redesign of the vehicle;
- It utilizes front and rear disc brakes activated by handle grips on the steering handle bars providing enhanced braking capability over friction braking,
- It provides not only on-board cargo and material carrying capability but also incorporates a rear towing hitch for facilitating the attachment of a wide variety of vehicles for towing and transport of personnel and materials;
- It utilizes rear wheel spacing of 40 inches or more, and in particular, spacing meeting or exceeding the overall wide of the vehicle itself for maximizes safety from accidental "tip-over".
- It incorporates the use of a highly-visible canopy for protecting the operator and enhancing its operational safety, and Not as the preferred embodiment, a four-wheeled design incorporating the use of two front extra-wide wheels mounted on either end of a front axle, mounted to a modified front fork and employing hand-activated disc brakes on each wheel thus allowing more stability with a slightly higher overall vehicle weight.

I claim:

1. A recumbent three or four-wheeled cycle with part-time on-demand electric power provided by a motor drive unit coupled with an on-board rechargeable battery, comprising:
   - two rear drive wheels and either one or two front wheels;
   - pedals and a chain engaged on sprockets providing a manual power system to the rear wheels by use of a multiple geared transmission drive system;
   - each rear wheel having a non-friction rotary drive member connected to a power coupling element capable of transmitting power independently to either of said rear wheels and connected to the rotary drive output of the motor drive unit and to the pedals, chain, and manual power system;
   - a front carriage frame, rear carriage frame, and power transmission system modularly connected together;
   - a hitch or receiver permanently attached to the rear carriage frame capable of connecting to said hitch or receiver a variety of non-powered vehicles for the purpose of towing cargo, material, or personnel;
   - an arched canopy frame modularly connected to the front and rear carriage frames;
   - a highly visible canopy mounted to the canopy frame; and
   - a photovoltaic cell panel attached to the canopy frame and coupled with the on-board rechargeable battery.

2. A cycle according to claim 1 including a front and rear wheel hand operated disc brake system.

3. A cycle according to claim 2 including a minimum spacing of the rear wheels of at least forty inches (40").

4. A cycle according to claim 3 including a canopy top connected modularly to the front and rear carriage claims.

* * * * *